(12) United States Patent
Kim (10) Patent No.: US 8,048,559 B2
(45) Date of Patent: Nov. 1, 2011

(54) SECONDARY BATTERY AND METHOD OF MAKING THE SECONDARY BATTERY

(75) Inventor: Daekyu Kim, Suwon-si (KR)

(73) Assignee: Samsung SDI Co., Ltd, Yongin-Si (KR)

( * ) Notice: Subject to any disclaimer, the term of this patent is extended or adjusted under 35 U.S.C. 154(b) by 21 days.

(21) Appl. No.: 12/554,504

(22) Filed: Sep. 4, 2009

(65) Prior Publication Data

US 2011/0008672 A1    Jan. 13, 2011

Related U.S. Application Data (60) Provisional application No. 61/223,857, filed on Jul. 8, 2009.

(51) Int. Cl.
  *H01M 2/08* (2006.01)
  *H01M 4/82* (2006.01)
(52) U.S. Cl. ....... 429/174; 29/623.2
(58) Field of Classification Search .......... 429/174; 29/623.2
  See application file for complete search history.

(56) References Cited

U.S. PATENT DOCUMENTS

| | | | |
|---|---|---|---|
| 2003/0068562 A1 | 4/2003 | Kim et al. | |
| 2003/0148174 A1 | 8/2003 | Gu | |
| 2004/0265702 A1 | 12/2004 | Kim | |
| 2006/0154138 A1 | 7/2006 | Miyamoto et al. | |
| 2006/0172190 A1 | 8/2006 | Kaplin et al. | |
| 2006/0251962 A1* | 11/2006 | Kim | 429/130 |
| 2007/0119047 A1 | 5/2007 | Gu | |
| 2007/0154787 A1* | 7/2007 | Jang et al. | 429/94 |
| 2008/0152997 A1 | 6/2008 | Lee | |
| 2008/0233474 A1 | 9/2008 | Son et al. | |
| 2009/0297929 A1* | 12/2009 | Uchida | 429/94 |

FOREIGN PATENT DOCUMENTS

| | | |
|---|---|---|
| EP | 1717879 | 11/2006 |
| EP | 1804320 | 7/2007 |
| EP | 2019442 | 1/2009 |
| JP | 06-150971 | 5/1994 |
| JP | 2001-273933 | 10/2001 |
| JP | 2008-19311 (A) | 1/2008 |

(Continued)

OTHER PUBLICATIONS

European Search Report dated Aug. 18, 2010 for EP Application No. 09252269.7.

(Continued)

*Primary Examiner* — Karie O'Neill Apicella
(74) *Attorney, Agent, or Firm* — Knobbe Martens Olson & Bear LLP (57) ABSTRACT

A secondary battery and a manufacturing method thereof are disclosed. In one embodiment, the secondary battery includes 1) an electrode assembly comprising an outer surface, 2) an electrolyte, 3) a sealing tape attached to and surrounding at least part of the outer surface of the electrode assembly, wherein the sealing tape comprises i) an adhesive layer contacting the outer surface of the electrode assembly and ii) a base layer formed on the adhesive layer, and wherein the base layer is formed of a material which has directionality and 4) a can accommodating the electrode assembly and sealing tape, wherein the base layer is configured to at least partially lose directionality upon contacting the electrolyte so that at least a portion of the base layer contacts an inner surface of the can.

14 Claims, 9 Drawing Sheets

FOREIGN PATENT DOCUMENTS

| | | |
|---|---|---|
| KR | 10-2003-0066959 (A) | 8/2003 |
| KR | 10-0719725 B1 | 5/2007 |
| KR | 10-2007-0025722 (A) | 8/2007 |
| KR | 10-2007-0096649 A | 10/2007 |
| KR | 10-2007-0096649 (A) | 10/2007 |
| KR | 10-2008-0057977 A | 6/2008 |
| KR | 10-2008-0057977 (A) | 6/2008 |
| KR | 10-2009-0007074 (A) | 1/2009 |

OTHER PUBLICATIONS

Office Action dated Mar. 24, 2011 for related U.S. Appl. No. 12/626,157, filed Nov. 25, 2009.

* cited by examiner

SECONDARY BATTERY AND METHOD OF MAKING THE SECONDARY BATTERY

RELATED APPLICATIONS

This application claims priority to and the benefit of Provisional Patent Application No. 61/223,857 filed on Jul. 8, 2009 in the U.S Patent and Trademark Office, the entire contents of which are incorporated herein by reference.

This application relates to U.S. patent application entitled "SECONDARY BATTERY AND METHOD OF MAKING THE SECONDARY BATTERY" Ser. No. 12/554,528, which is concurrently filed as this application and incorporated herein by reference in their entirety.

BACKGROUND OF THE INVENTION

1. Field of the Invention

Embodiments relate to a secondary battery and a method of making the secondary battery.

2. Description of the Related Technology

A can of a secondary battery accommodates an electrode assembly together with electrolyte. The electrode assembly includes a positive electrode plate, a negative electrode plate, and a separator disposed between the positive and negative electrode plates.

Secondary batteries may be classified into cylinder and prismatic types according to the shapes of cans. In a cylinder type secondary battery, a cylindrical electrode assembly is accommodated in a cylindrical can.

SUMMARY OF CERTAIN INVENTIVE ASPECTS

One aspect of the present invention is a secondary battery configured to prevent movement of an electrode assembly in a can, and a method of making the secondary battery.

Another aspect of the present invention is a secondary battery including: an electrode assembly; a sealing tape attached to an outer surface of the electrode assembly; and a can configured to accommodate the electrode assembly and electrolyte, wherein the sealing tape includes a base sheet configured to lose directionality and change in shape by contact with electrolyte and an adhesive layer disposed on the base sheet.

Another aspect of the present invention is a method of making a secondary battery, the method including: attaching a sealing tape to an outer surface of an electrode assembly, the sealing tape including a base sheet configured to lose directionality and change in shape by contact with electrolyte, and an adhesive layer disposed on the base sheet; and accommodating the electrode assembly to which the sealing tape is attached into a can together with electrolyte and assembling components.

Another aspect of the present invention is a secondary battery, comprising: an electrode assembly comprising an outer surface; an electrolyte; a sealing tape attached to and surrounding at least part of the outer surface of the electrode assembly, wherein the sealing tape comprises i) an adhesive layer contacting the outer surface of the electrode assembly and ii) a base layer formed on the adhesive layer, and wherein the base layer is formed of a material which has directionality; and a can accommodating the electrode assembly and sealing tape, wherein the base layer is configured to at least partially lose directionality upon contacting the electrolyte so that at least a portion of the base layer contacts an inner surface of the can.

In the above battery, at least a portion of the base layer is thicker than at least a different portion of the base layer. In the above battery, the base layer comprises at least one of the following: polystyrene (PS), polyamide, polyacrylonitrile, polyvinyl alcohol, polycarbonate, polyethylene vinyl acetate, and oriented polystyrene (OPS).

In the above battery, the electrolyte comprises a non-aqueous organic solvent which is configured to remove the directionality of the base layer. In the above battery, the electrolyte comprises a carbonate based non-polar organic solvent, the non-polar organic solvent, wherein the carbonate based non-polar organic solvent of the electrolyte comprises at least one of the following: dimethyl carbonate (DMC) electrolyte, diethyl carbonate (DEC) and dipropyl carbonate (DPC). In the above battery, the electrolyte comprises about 10% to about 60% by weight of a carbonate based non-polar organic solvent.

In the above battery, the base layer has a thickness in the range of about 10 μm and about 50 μm. In the above battery, the width of the sealing tape is equal to or greater than about 20% of the width of the electrode assembly. In the above battery, the adhesive layer comprises first and second sub-adhesive layers, wherein the base layer comprises first and second sub-base layers, wherein the first sub-base layer is configured to lose the directionality upon contacting the electrolyte so as to at least partially contact the inner surface of the can, wherein the first sub-adhesive layer is formed on the first sub-base layer, wherein the second sub-adhesive layer contacts the outer surface of the electrode assembly, and wherein the second sub-base layer is interposed between the first and second sub-adhesive layers.

In the above battery, the second sub-base layer comprises a polyolefine-based material. In the above battery, the polyolefine-based material comprises at least one of the following: polyethylene terephthalate (PET), polypropylene (PP), polyethylene (PE), and polyimide (PI). In the above battery, the second sub-base layer has a thickness in the range of about 10 μm and about 20 μm. In the above battery, the sealing tape partially covers the electrode assembly so that upper and lower end portions of the outer surface of the electrode assembly are not covered by the sealing tape.

Another aspect of the present invention is a secondary battery, comprising: an electrode assembly comprising an outer surface; a sealing tape attached to and surrounding at least part of the outer surface of the electrode assembly, wherein the sealing tape comprises i) an adhesive layer contacting the outer surface of the electrode assembly and ii) a base layer comprising first and second surfaces opposing each other, wherein the first surface contacts the adhesive layer, wherein the second surface is uneven; and a can accommodating the electrode assembly and sealing tape.

In the above battery, the second surface comprises a plurality of portions at least two of which has different heights. In the above battery, the plurality of portions comprise i) a first plurality of portions having a first height and ii) a second plurality of portions having second heights, wherein the first height is greater than the second heights, wherein the first plurality of portions of the base layer contact an inner surface of the can, and wherein the second plurality of portions of the base layer do not contact the inner surface of the can. In the above battery, the base layer comprises at least one of the following: polystyrene (PS), polyamide, polyacrylonitrile, polyvinyl alcohol, polycarbonate, polyethylene vinyl acetate, and oriented polystyrene (OPS).

Still another aspect of the present invention is a method of manufacturing a secondary battery, comprising: providing 1) an electrode assembly comprising an outer surface, 2) a sealing tape attached to and surrounding at least part of the outer surface of the electrode assembly, wherein the sealing tape comprises i) an adhesive layer contacting the outer surface of the electrode assembly and ii) a base layer formed on the adhesive layer, wherein the base layer is formed of a material which has directionality and 3) a can configured to receive the electrode assembly and sealing tape; placing the electrode assembly and the sealing tape into the can so as to form an assembled secondary battery; and subjecting the base layer to contact electrolyte so that the base layer at least partially loses directionality, wherein at least a portion of the base layer contacts an inner surface of the can.

In the above method, at least a portion of the base layer becomes thicker than at least a different portion of the base layer upon contacting the electrolyte. In the above method, the sealing tape partially covers the electrode assembly so that upper and lower end portions of the outer surface of the electrode assembly are not covered by the sealing tape, and wherein the electrolyte flows into the base layer via at least one of the upper and lower end portions of the outer surface of the electrode assembly.

In the above method, the sealing tape substantially completely covers the electrode assembly. In the above method, the width of the sealing tape is equal to or greater than about 20% of the width of the electrode assembly. In the above method, the base layer comprises at least one of the following: polystyrene (PS), polyamide, polyacrylonitrile, polyvinyl alcohol, polycarbonate, polyethylene vinyl acetate and oriented polystyrene (OPS). The above method further comprises performing at least one of a formation process and an aging process. In the above method, the aging process is performed by exposing the assembled battery to an environment having a temperature from about 50° C. to about 70° C. for about 18 hours to about 36 hours.

DETAILED DESCRIPTION OF CERTAIN INVENTIVE EMBODIMENTS

In a cylindrical can, the cylindrical electrode assembly can be easily rotated or slipped relative to the cylindrical can due to vibrations or impacts. Such relative movement may increase the internal resistance of the secondary battery and damage electrode tabs of the electrode assembly, and thus it is desirable to prevent such relative movement of the electrode assembly.

Exemplary embodiments will now be described more fully hereinafter with reference to the accompanying drawings. First, a secondary battery according to embodiments will now be described with reference to the accompanying drawings.

Referring to FIGS. 1 to 6, according to an exemplary embodiment, a secondary battery 5 includes a can 10, an electrode assembly 20, a lower insulating member 30, an upper insulating member 40, a sealing tape 50, and a cap assembly 100. In one embodiment, the secondary battery 5 is a cylinder type secondary battery. In another embodiment, the secondary battery 5 may be other type secondary battery. For example, the cross-section of the secondary battery has a polygonal shape. For convenience, a cylinder type secondary battery will be described.

In one embodiment, the can 10 has a cylindrical shape and is formed of a light conductive metal such as aluminum or an aluminum alloy. The can 10 may be made through a machining process such as deep drawing. The can 10 may have a different shape depending on the shape of the electrode assembly 20.

Figure 3:
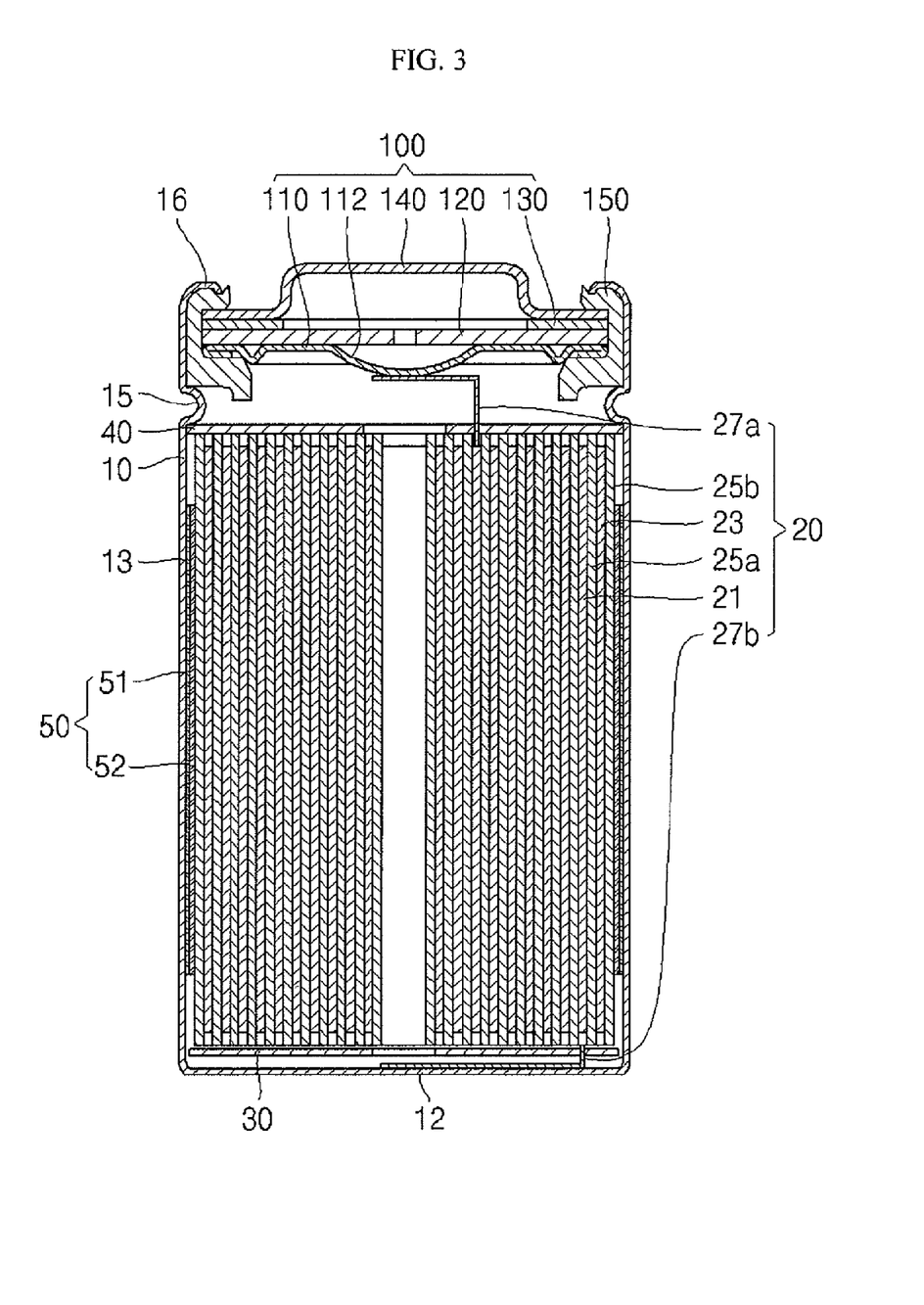
FIG. 3 illustrates a longitudinal sectional view of the secondary battery of FIG. 1.

Referring to FIG. 3, the can 10 includes a circular bottom plate 12 and a cylindrical sidewall 13 extending from the edge of the circular bottom plate 12. A beading part 15 is formed along the periphery of an upper part of the sidewall 13. The beading part 15 protrudes toward the inside of the sidewall 13. Owing to the beading part 15, the lower insulating member 30, the electrode assembly 20, and the upper insulating member 40 can be stably held in the can 10 without relative movement substantially perpendicular to the bottom plate 12. A crimping part 16 is formed on the top end of the sidewall 13. The crimping part 16 provides sealing between the can 10 and the cap assembly 100.

Figure 2:
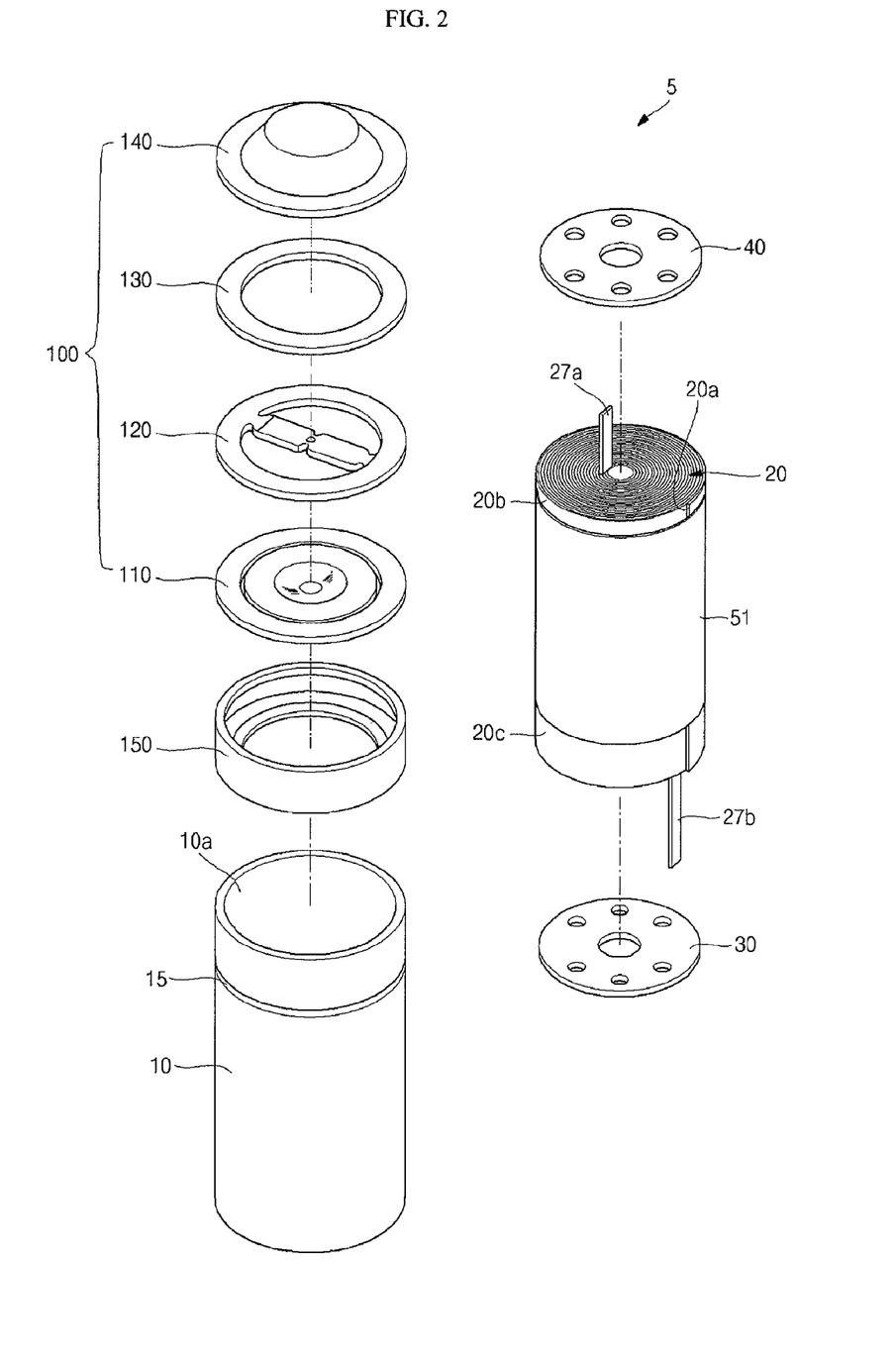
FIG. 2 illustrates an exploded perspective view of the secondary battery of FIG. 1.

Referring to FIG. 2, an opening 10a is formed at the top of the sidewall 13 so that the lower insulating member 30, the electrode assembly 20, the upper insulating member 40, and the cap assembly 100 can be sequentially inserted into the can 10 through the opening 10a.

Referring to FIG. 3, the electrode assembly 20 includes a first electrode plate 21, a second electrode plate 23, a first separator 25a, and a second separator 25b. The electrode assembly 20 further includes a first electrode tab 27a and a second electrode tab 27b. The electrode assembly 20 is formed by sequentially stacking the first electrode plate 21, the first separator 25a, the second electrode plate 23, and the second separator 25b, and winding the stack components in a cylindrical shape.

In one embodiment, the first electrode plate 21 is a positive electrode plate, and the second electrode plate 23 is a negative electrode plate. In another embodiment, the second electrode plate 23 may be a positive electrode plate and the first electrode plate 21 may be a negative electrode plate.

The first electrode plate (positive electrode plate) 21 may include a positive electrode collector (not shown) and a positive electrode coating portion (not shown). In one embodiment, the positive electrode collector is formed of a conductive metal so that the positive electrode collector can collect electrons from the positive electrode coating portion and deliver the electrons to an external circuit. The positive electrode coating portion may be formed of a mixture of a positive electrode active material, a conductive material, and a binder. The positive electrode coating portion is coated on the positive electrode collector. In one embodiment, the positive electrode coating portion is not coated on both side parts of the first electrode plate 21 along the winding direction of the first electrode plate 21 so as to form first non-coating portions. In one embodiment, the first electrode tab (positive electrode tab) 27a is coupled to one of the first non-coating portions by a method such as welding. Inside the can 10, the first electrode tab 27a extends from the first non-coating portion toward the opening 10a.

In one embodiment, the second electrode plate (negative electrode plate) 23 includes a negative electrode collector (not shown) and a negative electrode coating portion (not shown). The negative electrode collector may be formed of a conductive metal so that the negative electrode collector can collect electrons from the negative electrode coating portion and deliver the electrons to an external circuit. In one embodiment, the negative electrode coating portion is formed of a mixture of a negative electrode active material, a conductive material, and a binder. The negative electrode coating portion may be coated on the negative electrode collector. In one embodiment, the negative electrode coating portion is not coated on both side parts of the second electrode plate 23 along the winding direction of the second electrode plate 23 so as to form second non-coating portions. The second electrode tab (negative electrode tab) 27b may be coupled to one of the second non-coating portions by a method such as welding. Inside the can 10, the second electrode tab 27b extends from the second non-coating portion toward the bottom plate 12. The second electrode tab 27b may be coupled to the bottom plate 12 by a method such as welding. Thus, the can 10 has a negative polarity, and the bottom plate 12 of the can 10 is used as a negative terminal of the secondary battery 5.

The first and second separators 25a and 25b are used to isolate the first and second electrode plates 21 and 23. In one embodiment, fine pores are formed in the first and second separators 25a and 25b such that lithium ions can move between the first and second electrode plates 21 and 23. Each of the separators 25a and 25b may be formed of a polymer resin such as polyethylene (PE) and polypropylene (PP).

In one embodiment, the lower insulating member 30 has an approximate disk shape and provides insulation between the electrode assembly 20 and the bottom plate 12 of the can 10. The upper insulating member 40 may have an approximate disk shape and provides insulation between the electrode assembly 20 and the beading part 15 of the can 10.

The sealing tape 50 includes a base sheet (or base layer) 51 and an adhesive layer 52. In one embodiment, when the base sheet 51 makes contact with electrolyte, the directionality of the base sheet 51 is removed, and the shape of the base sheet 51 is changed. The adhesive layer 52 is formed on the base sheet 51.

Figure 4:
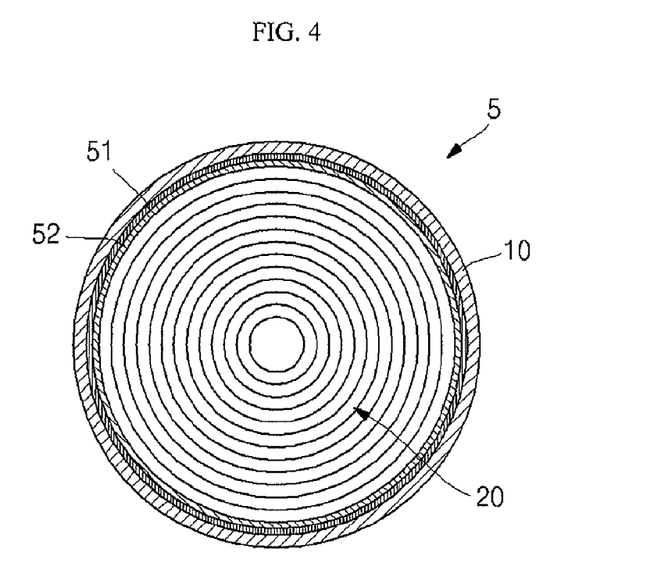
FIG. 4 illustrates a cross sectional view of the secondary battery of FIG. 1
Figure 5:
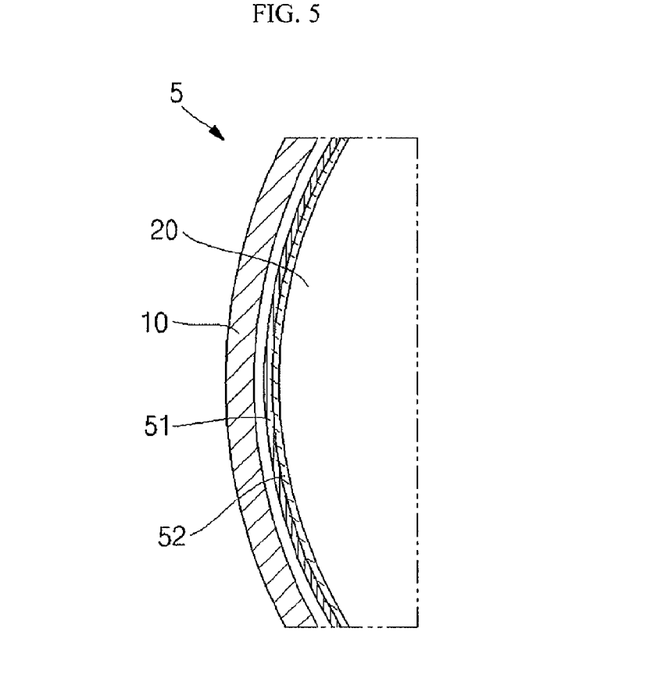
FIG. 5 illustrates a schematic cross sectional view of the secondary battery of FIG. 1, showing a state where electrolyte is not injected into the secondary battery.
Figure 6:
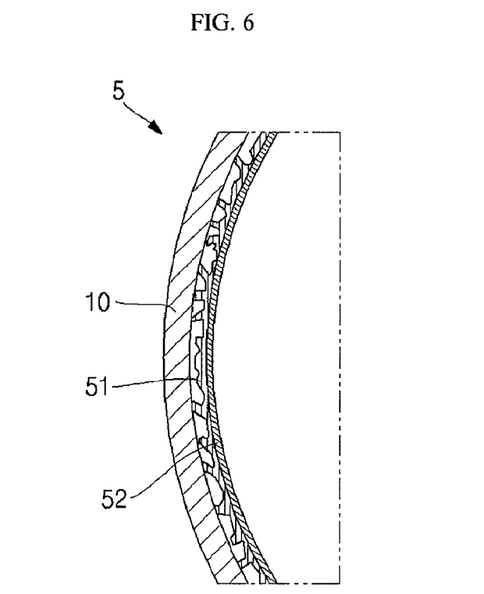
FIG. 6 illustrates a schematic cross sectional view of the secondary battery of FIG. 1, showing a state after electrolyte is injected into the secondary battery.

Referring to FIGS. 3 and 4, the sealing tape 50 is attached to the outer surface of the wound electrode assembly 20 so as to prevent unwinding of the electrode assembly 20. In one embodiment, the electrode assembly 20 includes a finishing part 20a at its outer surface, and the outermost end of the second separator 25b is placed at the finishing part 20a. In one embodiment, the sealing tape 50 is attached to the electrode assembly 20 in a manner such that the sealing tape 50 is wound around the outer surface of the electrode assembly 20 including the finishing part 20a. Therefore, unwinding of the electrode assembly 20 can be prevented. The sealing tape 50 is disposed between the outer surface of the electrode assembly 20 and the inner surface of the can 10.

In one embodiment, the base sheet 51 is a polymer film that can at least partially (partially, substantially or completely) lose its directionality and vary in shape when making contact with electrolyte. For example, when the polymer film is brought into contact with electrolyte, a non-polar organic solvent of the electrolyte permeates into molecules of the polymer film, and thus the directionality of the polymer film that is formed during the fabrication process of the polymer film may be at least partially removed. Herein, the term 'directionality' is used to denote the directionality of a film formed of a resin, which is caused during a manufacturing process such as uniaxial drawing, biaxial drawing, and compression.

When the directionality of the base sheet 51 is at least partially removed as described above, the base sheet 51 which is fabricated by drawing is deformed. By this deformation, the surface of the base sheet 51 may become uneven. Further, the thickness of the base sheet 51 may be locally increased and decreased, and locally thicker parts of the base sheet 51 may make contact with the inner surface of the can 10, so that the frictional force between the locally thicker parts of the base sheet 51 and the inner surface of the can 10 is increased. Therefore, the electrode assembly 20 can be held in the can 10 more stably without movement relative to the can 10 by frictional force (See FIGS. 6 and 8). That is, by deformation, certain portions of the base sheet 51 may become thicker than other portions of the base sheet 51.

The base sheet 51 may be formed of any polymer film as long as the polymer film can at least partially lose its directionality formed during a fabrication process (such as uniaxial drawing, biaxial drawing, or compression) and change in shape by contact with electrolyte. The base sheet 51 may be formed of polystyrene (PS), polyamide, polyacrylonitrile, polyvinyl alcohol, polycarbonate, or polyethylene vinyl acetate, which can easily lose its directionality by a non-polar organic solvent of electrolyte owing to its relatively large intermolecular distance. In an embodiment, the base sheet 51 may be formed of a polystyrene (PS) film. In another embodiment, the base sheet 51 may be formed of an oriented polystyrene (OPS) film.

In one embodiment, any electrolyte can be used as long as the electrolyte includes a non-aqueous organic solvent for removing the directionality of a polymer film. For example, the non-aqueous organic solvent may include carbonate. Examples of such carbonates include dimethyl carbonate (DMC) electrolyte, diethyl carbonate (DEC), dipropyl carbonate (DPC), methylpropylcarbonate (MPC), ethylpropyl carbonate (EPC), methylethyl carbonate (MEC), ethylene carbonate (EC), propylene carbonate (PC), and butylene carbonate (BC). In one embodiment, the electrolyte includes a carbonate based non-polar organic solvent. For example, the carbonate based non-polar organic solvent may include dimethyl carbonate (DMC) diethyl carbonate (DEC) and dipropyl carbonate (DPC). Such a carbonate based non-polar organic solvent may easily permeate between molecules of a polymer such as polystyrene (PS) having a relatively large intermolecular distance, so that the directionality of the polymer can be easily removed.

In one embodiment, electrolyte used for the secondary battery 5 may include about 10% to about 60% by weight of a carbonate based non-polar organic solvent. For example, the electrolyte may include about 10% to about 60% by weight of a dimethyl carbonate (DMC) solvent, diethyl carbonate (DEC) or dipropyl carbonate (DPC) solvent as a carbonate based non-polar organic solvent. The above range (about 10% to about 60%) may provide an optimum balance between prevention of movement of the electrode assembly 20 and sufficient deformation of the polymer. However, depending on the embodiments, the electrolyte may include less than about 10% or more than about 60% by weight of a dimethyl carbonate (DMC) solvent, diethyl carbonate (DEC)

solvent or dipropyl carbonate (DPC) as a carbonate based non-polar organic solvent. In one embodiment, except for the organic solvent, the electrolyte may include other components that are known in the related art. That is, any electrolyte including a carbonate based non-polar organic solvent such as dimethyl carbonate (DMC) solvent, diethyl carbonate (DEC) solvent or dipropyl carbonate (DPC) may be used.

Since the base sheet 51 can be deformed according to the size of a battery, the base sheet 51 is not limited to a specific size. For example, the base sheet 51 may have a thickness in the range of about 10 μm to about 50 μm. The above thickness range (about 10 μm to about 50 μm) may provide an optimum balance between prevention of movement of the electrode assembly 20 and a sufficient capacity of the secondary battery 5. However, depending on the embodiments, the base sheet 51 may have a thickness less than about 10 μm or greater than about 50 μm.

The adhesive layer 52 is coated on the base sheet 51 and is disposed to make contact with the finishing part 20a formed on the outer surface of the wound electrode assembly 20.

The adhesive layer 52 may be formed of any adhesive material that is generally used for a sealing tape in the related art. For example, the adhesive layer 52 may be formed by coating the base sheet 51 with an acryl-based adhesive. The acryl-based adhesive may be an adhesive selected from the group consisting of poly methyl methacrylate (PMMA), poly ethyl methacrylate (PEMA), and poly butyl methacrylate (PBMA).

The adhesive layer 52 may be formed on the base sheet 51 by using various coating methods known in the related art, and the thickness of the adhesive layer 52 can be varied. For example, the adhesive layer 52 may be formed to a thickness of about 1 μm to about 30 μm by coating the base sheet 51 with an adhesive through a knife coating process. However, in another embodiment, the base sheet 51 may be formed to a different thickness by using another coating method.

The sealing tape 50 may be attached to the electrode assembly 20 in a manner such that the entire height of the electrode assembly 20 is enclosed by the sealing tape 50. Alternatively, the sealing tape 50 may be attached to the electrode assembly 20 except for an upper end part 20b and a lower end part 20c of the outer surface of the electrode assembly 20 as shown in FIG. 2. Electrolyte may permeate between the can 10 and the electrode assembly 20 through the upper end part 20b, and the electrolyte injected to the bottom of the can 10 may make contact with the electrode assembly 20 at the lower end part 20c. Therefore, when immersion of the electrode assembly 20 in the electrolyte is considered, the sealing tape 50 may be not attached to the upper end part 20b and the lower end part 20c. In one embodiment, the width of the sealing tape 50 is not limited to a specific value. However, the width of the sealing tape 50 may be equal to or greater than about 20% of the width of the electrode assembly 20. The above range (equal to or greater than about 20%) may be advantageous to prevent movement of the electrode assembly 20. However, depending on the embodiments, the width of the sealing tape 50 may be less than about 20% of the width of the electrode assembly 20.

The sealing tape 50 may be wound once around the entire circumference of the electrode assembly 20. However, if necessary, the sealing tape 50 may be wound one or more times around the electrode assembly 20. Alternatively, the sealing tape 50 may be wound around only a portion of the electrode assembly 20 in the circumferential direction of the electrode assembly 20. For effectively preventing movement of the electrode assembly 20 relative to the can 10, the sealing tape 50 may be wound one or more times around the entire circumference of the electrode assembly 20.

The cap assembly 100 is disposed between the crimping part 16 and the beading part 15. The cap assembly 100 includes a safety vent 110, a current interrupt device (CID) 120, a positive temperature coefficient (PTC) device 130, and a cap-up 140 that are disposed in this order from the electrode assembly 20.

The safety vent 110 electrically connects the first electrode tab 27a and the CID 120. The safety vent 110 includes a protrusion 112 at a center part. The protrusion 112 is convex toward the electrode assembly 20 and electrically connected to the first electrode tab 27a. If the inside pressure of the secondary battery 5 exceeds a reference pressure, the protrusion 112 may be reversed. The CID 120 electrically connects the safety vent 110 and the PTC device 130. If the protrusion 112 is reversed due to an increased inside pressure of the secondary battery 5, the CID 120 may be broken so that the safety vent 110 and the PTC device 130 can be electrically disconnected.

The electric resistance of the PTC device 130 may increase steeply as the surrounding temperature increases. The PTC device 130 electrically connects the CID 120 and the cap-up 140. If the temperature of the secondary battery 5 increases excessively, the electric resistance of the PTC device 130 may increase greatly so that the flow of an electric current can be interrupted.

The cap-up 140 is electrically connected to the PTC device 130 and exposed to the outside of the secondary battery 5. The cap-up 140 is used as a positive terminal of the secondary battery 5. The cap assembly 100 is insulated from the can 10 by an insulating gasket 150. The insulating gasket 150 is disposed around the circumference of the cap assembly 100 and fixed to the inside of the can 10 by the beading part 15 and the crimping part 16.

Figure 1:
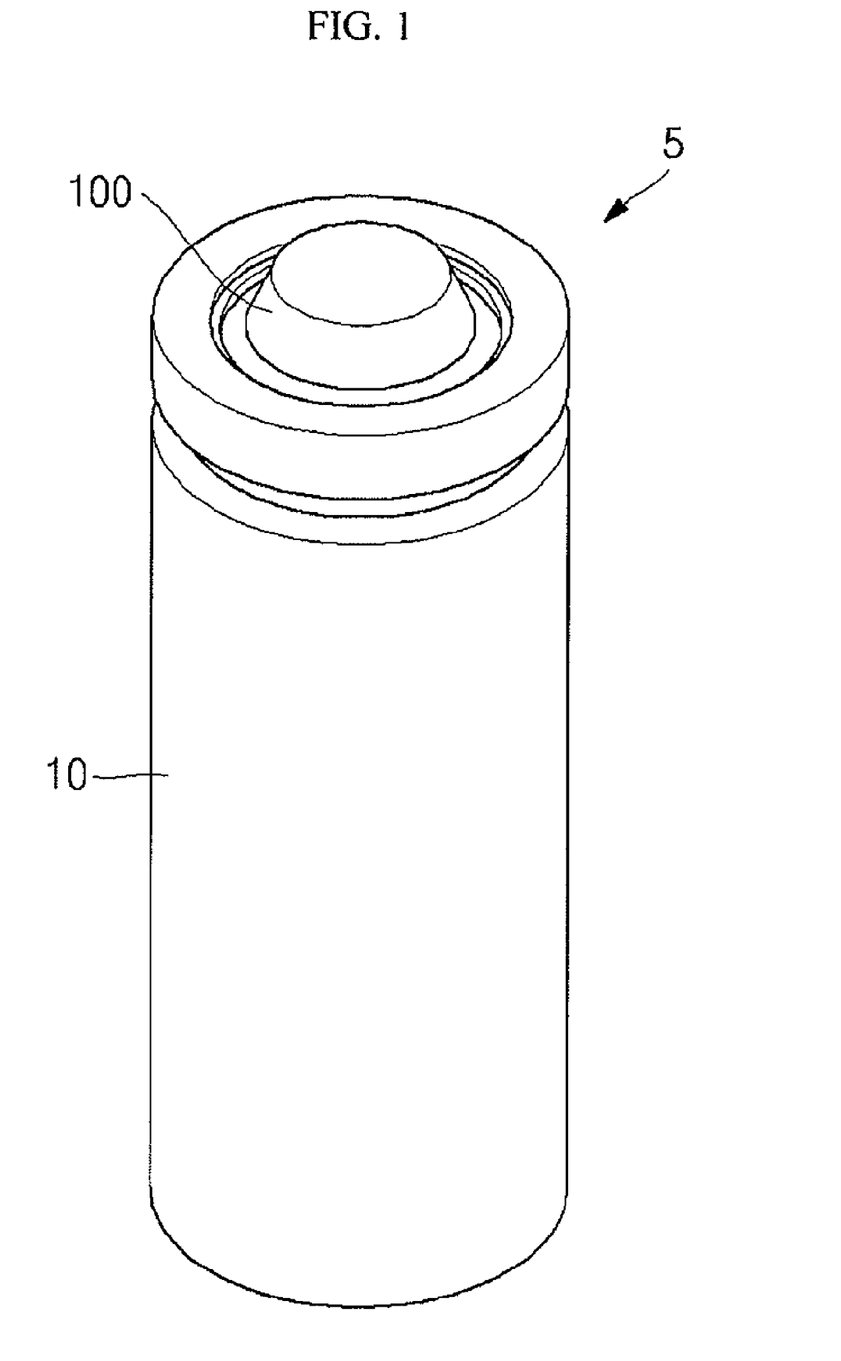
FIG. 1 illustrates a perspective view of a secondary battery according to an embodiment.

The structure of the cap assembly 100 shown in FIGS. 1 to 3 is an exemplary structure provided for describing an embodiment. The structure of the cap assembly 100 can be variously changed. It will be apparent to those of ordinary skill in the art that the structure of the cap assembly 100 shown in FIGS. 1 to 3 may be changed or modified without departing from the spirit and scope of the present invention.

Figure 7:
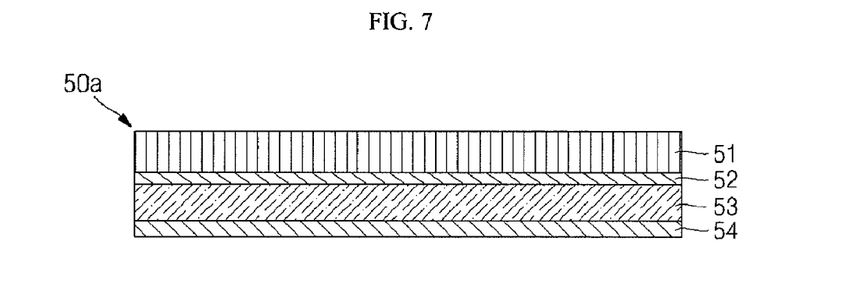
FIG. 7 illustrates a sectional view of a sealing tape used in a secondary battery according to another embodiment.
Figure 8:
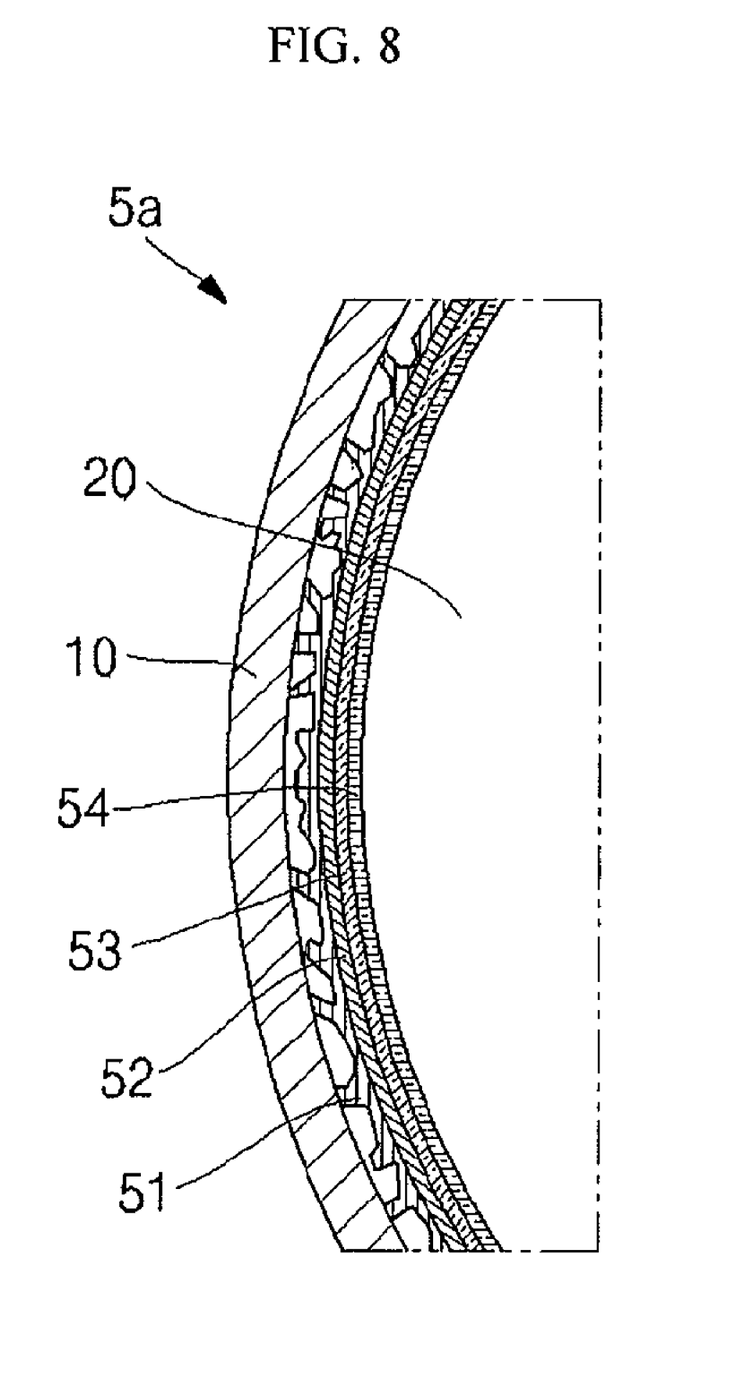
FIG. 8 illustrates a schematic view of an electrode assembly to which the sealing tape is attached, showing a state after electrolyte is injected into the electrode assembly.

FIG. 7 illustrates a sectional view of a sealing tape used in a secondary battery according to another embodiment, and FIG. 8 illustrates a schematic view of an electrode assembly to which the sealing tape is attached, showing a state after electrolyte is injected into the electrode assembly.

In one embodiment, as shown in FIGS. 7 and 8, a secondary battery 5a includes a sealing tape 50a wound around the outer surface of an electrode assembly 20 accommodated in a can 10. The secondary battery 5a has the same structure as the secondary battery 5 illustrated in FIGS. 1 to 6 except for the sealing tape 50a. Thus, only the sealing tape 50a will be described in detail.

The sealing tape 50a includes: a base sheet 51 that can at least partially lose its directionality and change in shape or deform by contact with electrolyte; a first adhesive layer 52 disposed on the base sheet 51; an auxiliary base sheet 53 disposed on the adhesive layer 52; and a second (or auxiliary) adhesive layer 54 disposed on the auxiliary base sheet 53.

The sealing tape 50a is attached to the outer surface of the electrode assembly 20 so as to prevent unwinding of the electrode assembly 20. The sealing tape 50a is disposed between the outer surface of the electrode assembly 20 and the inner surface of the can 10. The base sheet 51 and the first adhesive layer 52 are the same as those illustrated in FIGS. 1 to 6. Thus, detailed descriptions thereof will not be repeated.

The auxiliary base sheet 53 disposed on the first adhesive layer 52 is used to prevent unwinding of the electrode assembly 20 when the base sheet 51 is deformed. The auxiliary base sheet 53 may be formed of a polyolefine-based material such as polyethylene terephthalate (PET), polypropylene (PP), polyethylene (PE), and polyimide (PI). However, the auxiliary base sheet 53 is not limited to the polyolefine-based material.

The auxiliary base sheet 53 may have a thickness in the range of about 10 μm to about 20 μm. However, the thickness of the auxiliary base sheet 53 is not limited to the range. That is, the thickness of the auxiliary base sheet 53 can be varied.

The second adhesive layer 54 supports the auxiliary base sheet 53 and is attached to the electrode assembly 20 to prevent unwinding of the electrode assembly 20. Like the first adhesive layer 52, the second adhesive layer 54 may be formed of any adhesive material that is generally used for a sealing tape in the related art. For example, the second adhesive layer 54 may be formed by coating the auxiliary base sheet 53 with an acryl-based adhesive. The acryl-based adhesive may be an adhesive selected from the group consisting of poly methyl methacrylate (PMMA), poly ethyl methacrylate (PEMA), and poly butyl methacrylate (PBMA).

Like the first adhesive layer 52, the second adhesive layer 54 can be formed on the auxiliary base sheet 53 by using various coating methods known in the related art, and the thickness of the second adhesive layer 54 can be varied. For example, the second adhesive layer 54 may be formed to a thickness of about 1 μm to about 30 μm by coating the auxiliary base sheet 53 with an adhesive through a knife coating process. However, in another embodiment, the second adhesive layer 54 may be formed to a different thickness by using another coating method.

A method of making a secondary battery will now be described with reference to FIGS. 1 to 6. In an embodiment, a secondary battery making method includes attaching and assembling operations.

In the attaching operation, a sealing tape 50 is attached to the outer surface of an electrode assembly 20. The sealing tape 50 includes a base sheet 51 and an adhesive layer 52. The base sheet 51 can at least partially lose its directionality and vary in shape when making contact with electrolyte.

The sealing tape 50 including the base sheet 51 and the adhesive layer 52 is described in detail in the previous embodiments. Thus, a detailed description thereof will not be repeated. The sealing tape 50 is disposed between the outer surface of the electrode assembly 20 and the inner surface of a can 10.

In the assembling operation, the electrode assembly 20 to which the sealing tape 50 is attached is inserted in the can 10, electrolyte is filled in the can 10, and other components of a secondary battery 5 are assembled.

In detail, a lower insulating member 30, the electrode assembly 20 and the sealing tape 50, and an upper insulating member 40 are sequentially arranged from a lower side. In this state, a second electrode tab 27b of the electrode assembly 20 is coupled to a bottom plate 12 of the can 10 by a method such as welding. At this time, a beading part and a crimping part are not yet formed at the can 10.

Next, the lower insulating member 30, the electrode assembly 20 to which the sealing tape 50 is attached, and the upper insulating member 40 are sequentially inserted into the can 10 through an opening 10a of the can 10.

Thereafter, a beading part 15 is formed at a sidewall 13 of the can 10 so that the lower insulating member 30, the electrode assembly 20 to which the sealing tape 50 is attached, and the upper insulating member 40 can be stably held in the can 10 without movement substantially perpendicular to the bottom plate 12.

After that, electrolyte is injected into the can 10, and thus the base sheet 51 of the sealing tape 50 attached to the outer surface of the electrode assembly 20 is brought into contact with the electrolyte. Then, a non-polar organic solvent of the electrolyte permeates between molecules of the base sheet 51, and thus, directionality applied to the base sheet 51 during a manufacturing process of the base sheet 51 is removed. As the directionality of the base sheet 51 is at least partially removed, the base sheet 51 which is fabricated by drawing is deformed and the surface of the base sheet 51 may become uneven. By this deformation, the thickness of the base sheet 51 may be locally increased and decreased, and locally thicker parts of the base sheet 51 may make contact with the inner surface of the can 10, so that the electrode assembly 20 can be held in the can 10 more stably without movement relative to the can 10 by frictional force between the locally thicker parts of the base sheet 51 and the inner surface of the can 10.

Next, an insulating gasket 150 is inserted through the opening 10a and placed on the beading part 15. Thereafter, a cap assembly 100 is placed inside the insulating gasket 150. After that, a crimping part 16 is formed on the upper end of the sidewall 13 so as to fix the insulating gasket 150 and the cap assembly 100. After the secondary battery 5 is assembled in this way, a post-treatment operation such as a formation operation and an aging operation may be performed.

In the formation operation, the assembled secondary battery 5 may be repeatedly charged and discharged so as to activate the secondary battery 5. When the secondary battery 5 is charged, lithium ions moves from a lithium metal oxide used as a positive electrode to a carbon electrode used as a negative electrode. At this time, since lithium is highly reactive, the lithium ions react with the negative carbon electrode to produce reaction products such as $Li_2$, $CO_3$, LiO, and LiOH which form a film called 'solid electrolyte interface (SEI)' on the surface of the carbon electrode.

In the aging operation, the secondary battery 5 may be allowed to sit for a predetermined time so as to stabilize the SEI film. For example, in the aging operation, the secondary battery 5 may be allowed to sit for about 18 hours to about 36 hours at about 50° C. to about 70° C. During the aging operation, the base sheet 51 of the sealing tape 50 is sufficiently deformed to form locally thicker parts, and thus movement of the electrode assembly 20 relative to the can 10 can be effectively prevented by the locally thicker parts of the base sheet 51.

Although the base sheet 51 is deformed, the secondary battery 5 can be stably kept owing to the electrolyte. The electrolyte is chemically stable, and if the electrolyte is inspected by linear sweep voltammetry (LSV), it is measured that the electrolyte has an unchanged decomposition initiation voltage.

Hereinafter, certain examples according to exemplary embodiments will be described. However, the present invention is not limited to such examples.

Example 1

As a positive electrode active material, a binder, and a conductive material, $LiCoO_2$, polyvinylidene fluoride (PVDF), and carbon were mixed at a weight ratio of 92:4:4, and the mixture was dispersed in N-methyl-2-pyrrolidone so as to form a positive electrode slurry. A copper foil having a thickness of about 20 μm was coated with the positive electrode slurry and was dried and rolled to form a positive electrode.

As a negative electrode active material, a binder, and a thickener, artificial graphite, styrene-butadiene rubber, and carboxymethylcellulose were mixed at a weight ratio of 96:2:2, and the mixture was dispersed in water so as to form a negative electrode slurry. A copper foil having a thickness of about 15 µm was coated with the negative electrode slurry and was dried and rolled to form a negative electrode.

A polyethylene/polypropylene porous film (Hoest Cellanese, U.S.) having a thickness of 20-µm was used as a separator. The separator was placed between the cathode and the anode. Then, the separator, the cathode, and the anode were wound, and a sealing tape was wound around them. In this way, an electrode assembly was made.

A 25-µm thickness oriented polystyrene (OPS) film coated with a 15-µm thickness poly methyl methacrylate (PMMA) adhesive layer was used as the sealing tape.

The electrode assembly wound by a jelly-roll method was inserted in a cylindrical aluminum battery case, and non-aqueous electrolyte was injected into the case. Then, the case was sealed. In this way, a secondary battery was fabricated.

Here, a mixture organic solvent of ethylene carbonate (EC), dimethyl carbonate (DMC), propylene carbonate (PC), and fluororobenzene (FB) (volumetric ratio of EC:DMC:PC:FB was 30:55:5:10), in which 1.1 M of LiPF6 was dissolved, was used as the non-aqueous electrolyte.

Example 2

Example 2 was performed substantially in the same way as Example 1 except that only dimethyl carbonate (DMC) was used as a non-aqueous electrolyte.

Comparison Example 1

Comparison Example 1 was performed substantially in the same way as Example 1 except that a polyethylene terephthalate (PET) film coated with a poly methyl methacrylate (PMMA) adhesive layer was used as a sealing tape.

Comparison Example 2

Comparison Example 2 was performed substantially in the same way as Example 1 except that a sealing tape was not used.

Experimental Example 1

Chemical Stability

Figures 9, 9A:
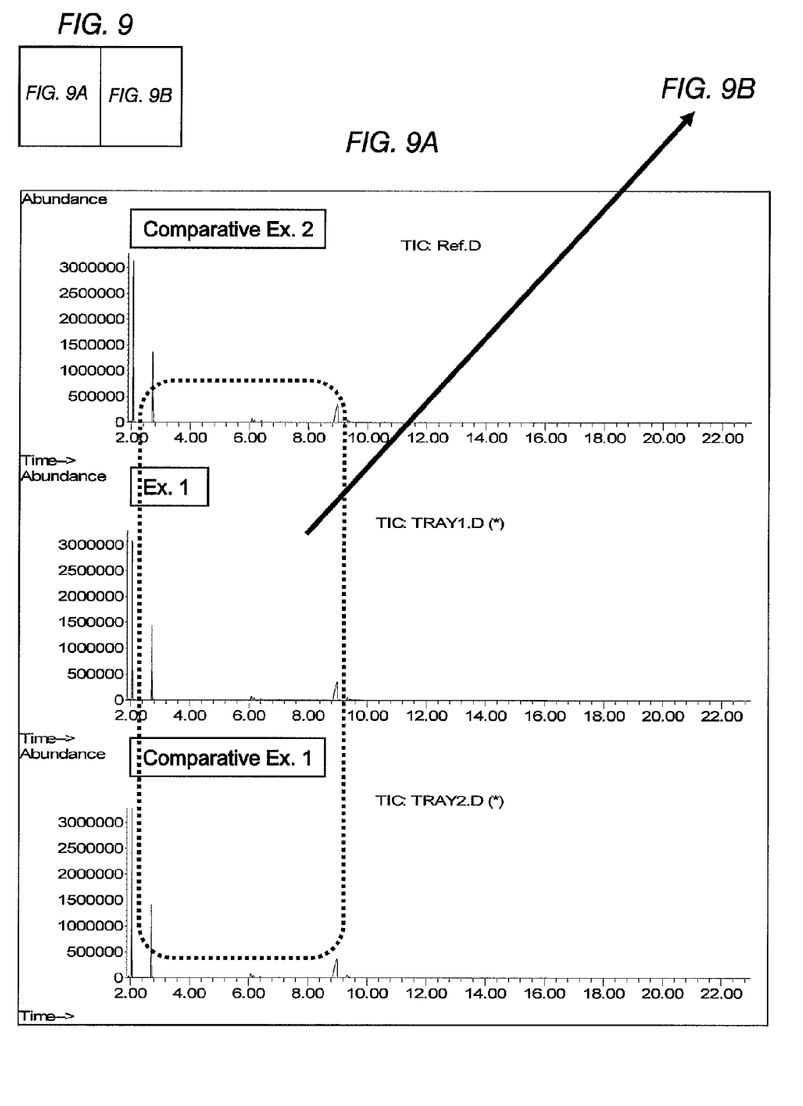
FIG. 9 illustrates a chemical stability measurement graph of Experimental Example 1.
Figure 9B:
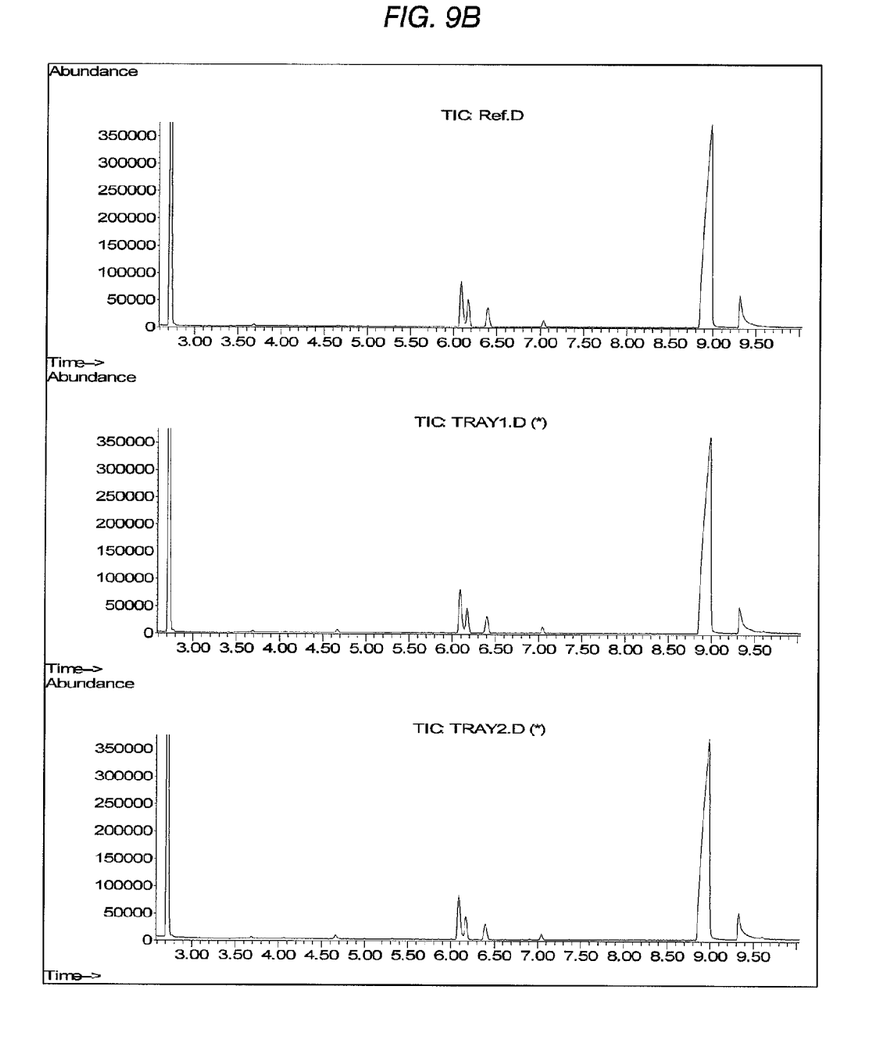

In Example 1, Comparison Example 1, and Comparison Example 2, the stabilities of the electrolytes were measured with respect to time, and the results were shown in FIG. 9.

As shown in FIG. 9, chemical stability is not affected although a base sheet is deformed by contact with electrolyte as described in the above embodiments.

Experimental Example 2

LSV (Linear Sweep Voltammetry)

Figure 10:
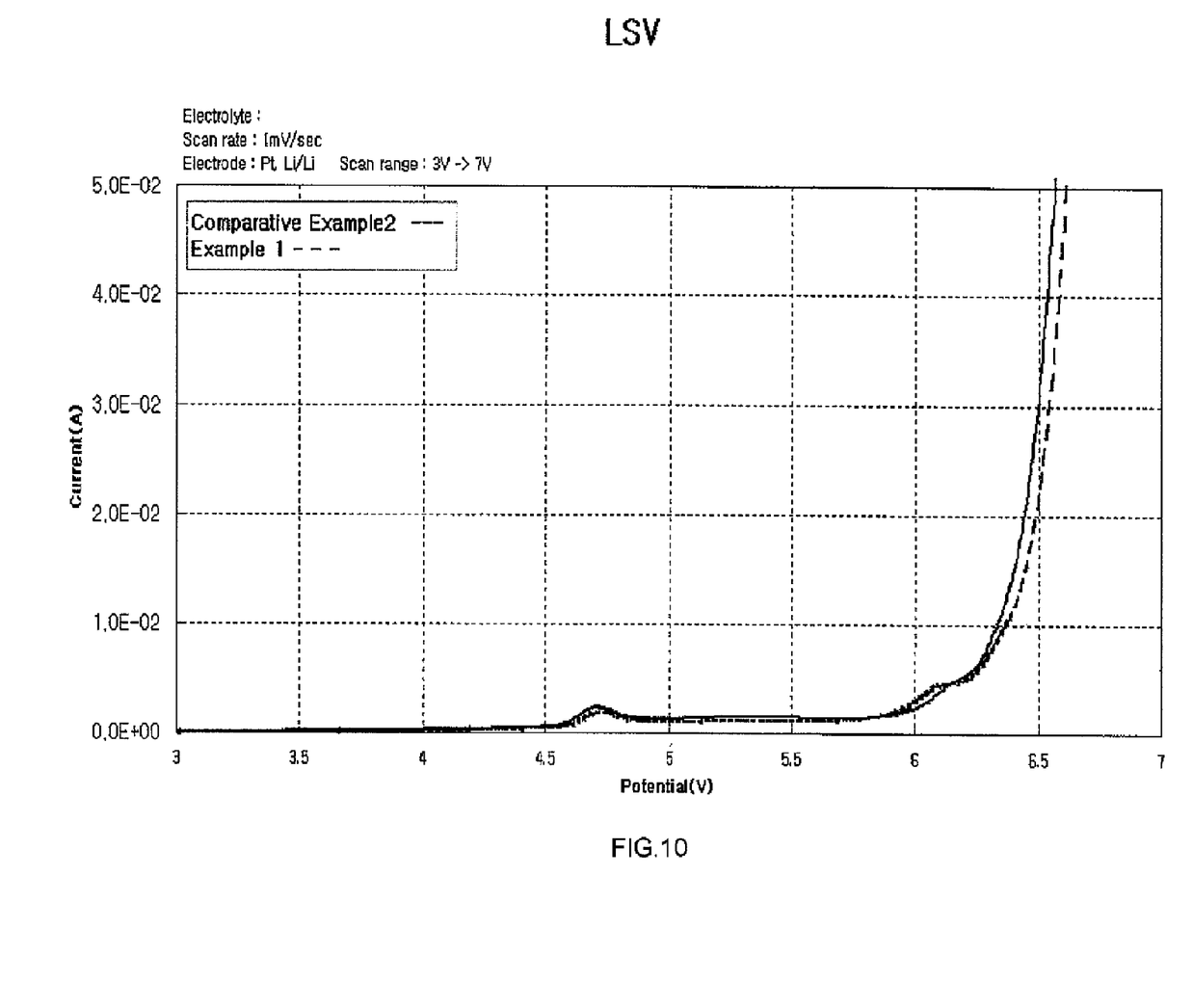
FIG. 10 illustrates a linear sweep voltammetry (LSV) measurement graph of Experiment Example 2.

In Example 1, Comparison Example 1, and Comparison Example 2, the decomposition initiation voltages of the electrolytes were measured, and the results were shown in FIG. 10. Measurement conditions are as follows.

Working electrode: Pt, reference electrode: Li-metal, counter electrode: Li-metal, Voltage range: 3 V to 7 V, scan rate: 5 mV/s.

As shown in FIG. 10, the electrolyte of Example 1 has a decomposition initiation voltage similar to those of the electrolytes of Comparison Example 2. That is, chemical stability is not affected although a base sheet is deformed by contact with electrolyte as described in the above embodiment.

Experimental Example 3

Measurement of Movement

Relative movements of the secondary batteries of Examples 1 and 2 were measured, and the results were shown in Table 1.

The relative movements were measured as follows. The bottoms of cans of the secondary batteries were cut, and if a value measured by using a push-pull gage was equal to or greater than 1 kgf/cm², it was determined that there is no relative movement. If a value measured by using a push-pull gage was smaller than 1 kgf/cm², it was determined that there is relative movement.

TABLE 1

|  | 1 min | 5 min | 10 min | 1 hour | 3 hours | 24 hours |
|---|---|---|---|---|---|---|
| Example 1 | ○ | ○ | ○ | X | X | X |
| Example 2 | X | X | X | X | X | X |

* ○: there is a relative movement, X: there is no relative movement

As shown in Table 1, in the case of Example 1 where general electrolyte is used, the electrode assembly was not moved after one hour. In Example 2 where electrolyte including only DMC as an organic solvent is used, relative movement of the electrode assembly was effectively prevented.

According to at least one embodiment, the base sheet of the sealing tape may at least partially lose its directionality and deforms by contact with electrolyte, and locally thicker parts of the base sheet formed by the deformation may make contact with the inner surface of the can so that the electrode assembly can be stable held in the can without movement relative to the can by frictional force. In addition, according to embodiments, the electrolyte can be chemically stable although the base sheet deforms.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A secondary battery, comprising:
    an electrode assembly comprising an outer surface;
    an electrolyte;
    a sealing tape attached to and surrounding at least part of the outer surface of the electrode assembly, wherein the sealing tape comprises i) an adhesive layer contacting the outer surface of the electrode assembly and ii) a base layer formed on the adhesive layer, and wherein the base layer is formed of a material which has directionality; and
    a can accommodating the electrode assembly and sealing tape,
    wherein the base layer is configured to at least partially lose directionality and to locally increase and decrease in thickness upon contacting the electrolyte so that at least a portion of the base layer contacts an inner surface of the can.

2. The secondary battery of claim 1, wherein at least a portion of the base layer is thicker than at least a different portion of the base layer.

3. The secondary battery of claim 1, wherein the base layer comprises at least one of the following: polyamide, polyvinyl alcohol, polycarbonate, polyethylene vinyl acetate, and oriented polystyrene (OPS).

4. The secondary battery of claim 1, wherein the electrolyte comprises a non-aqueous organic solvent which is configured to remove the directionality of the base layer.

5. The secondary battery of claim 1, wherein the electrolyte comprises a carbonate based non-polar organic solvent,
wherein the carbonate based non-polar organic solvent of the electrolyte comprises at least one of the following: dimethyl carbonate (DMC) electrolyte, diethyl carbonate (DEC) and dipropyl carbonate (DPC).

6. The secondary battery of claim 4, wherein the electrolyte comprises about 10% to about 60% by weight of a carbonate based non-polar organic solvent.

7. The secondary battery of claim 1, wherein the base layer has a thickness in the range from about 10 μm to about 50 μm.

8. The secondary battery of claim 1, wherein the width of the sealing tape is equal to or greater than about 20% of the width of the electrode assembly.

9. The secondary battery of claim 1, wherein the adhesive layer comprises first and second sub-adhesive layers, wherein the base layer comprises first and second sub-base layers, wherein the first sub-base layer is configured to lose the directionality upon contacting the electrolyte so as to at least partially contact the inner surface of the can, wherein the first sub-adhesive layer is formed on the first sub-base layer, wherein the second sub-adhesive layer contacts the outer surface of the electrode assembly, and wherein the second sub-base layer is interposed between the first and second sub-adhesive layers.

10. The secondary battery of claim 9, wherein the second sub-base layer comprises a polyolefine-based material.

11. The secondary battery of claim 10, wherein the polyolefine-based material comprises at least one of the following: polyethylene terephthalate (PET), polypropylene (PP), polyethylene (PE), and polyimide (PI).

12. The secondary battery of claim 9, wherein the second sub-base layer has a thickness in the range from about 10 μm to about 20 μm.

13. The secondary battery of claim 1, wherein the sealing tape partially covers the electrode assembly so that upper and lower end portions of the outer surface of the electrode assembly are not covered by the sealing tape.

14. A secondary battery, comprising:
an electrode assembly comprising an outer surface;
an electrolyte;
a sealing tape attached to and surrounding at least part of the outer surface of the electrode assembly, wherein the sealing tape comprises i) an adhesive layer contacting the outer surface of the electrode assembly and ii) a base layer formed on the adhesive layer, and wherein the base layer is formed of a material which has directionality; and
a can accommodating the electrode assembly and sealing tape,
wherein the base layer is configured to at least partially lose directionality upon contacting the electrolyte so that at least a portion of the base layer contacts an inner surface of the can, and wherein the base layer comprises at least one of the following: polyamide, polyvinyl alcohol, polycarbonate, polyethylene vinyl acetate and oriented polystyrene (OPS).

* * * * *